United States Patent
Fairbanks

[15] 3,683,059
[45] Aug. 8, 1972

[54] METHOD FOR MAKING RETICULATED STRUCTURES

[72] Inventor: Theodore H. Fairbanks, Liverpool, Pa. 17045

[73] Assignee: FMC Corporation, Philadelphia, Pa.

[22] Filed: July 17, 1970

[21] Appl. No.: 55,835

Related U.S. Application Data

[63] Continuation-in-part of Ser. No. 778,134, Nov. 22, 1968, Pat. No. 3,577,587.

[52] U.S. Cl. .................. 264/167, 264/177, 264/237, 264/DIG. 81
[51] Int. Cl. ......... B29c 25/00, B29f 3/00, D01d 5/20
[58] Field of Search ....... 264/167, DIG. 81, 177, 171, 264/237

[56] References Cited

UNITED STATES PATENTS

| | | |
|---|---|---|
| 3,012,275 | 12/1961 | Nalle, Jr. .................. 18/12 |
| 3,384,692 | 5/1968 | Galt et al. .................. 264/167 |
| 3,019,147 | 1/1962 | Nalle, Jr. ............. 264/DIG. 81 |
| 2,919,467 | 1/1960 | Mercer ..................... 264/167 |

FOREIGN PATENTS OR APPLICATIONS

| | | |
|---|---|---|
| 380,369 | 9/1964 | Switzerland ........ 264/DIG. 81 |

Primary Examiner—Robert F. White
Assistant Examiner—Jeffery R. Thurlow
Attorney—Thomas R. O'Malley, George F. Mueller and Eugene G. Horsky

[57] ABSTRACT

Method for making reticulated structures by periodically contacting adjacent streams of a series of generally like streams of flowable material as they are extruded along sinuous paths, and thereafter setting the extruded under the same pressure streams.

4 Claims, 9 Drawing Figures

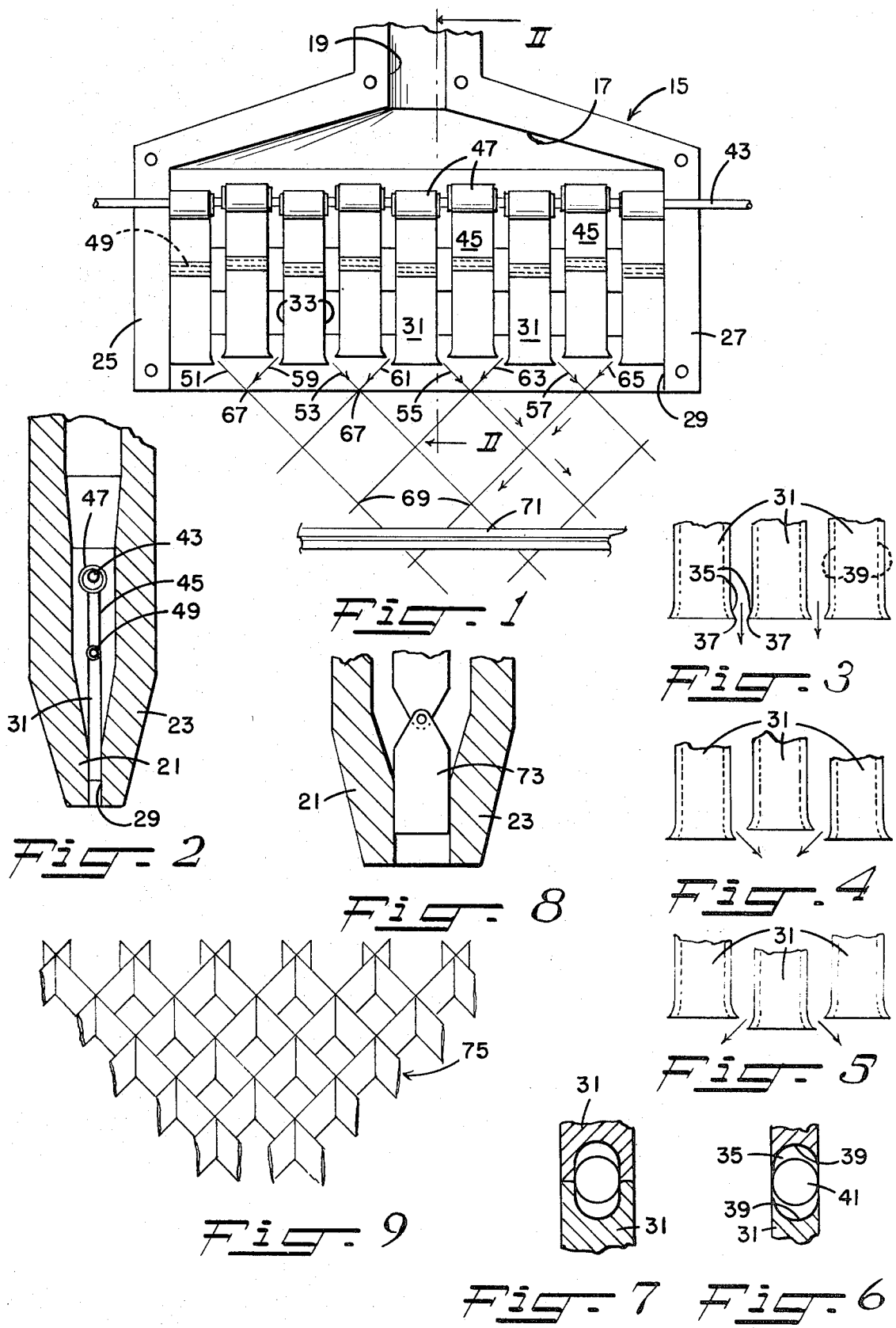

METHOD FOR MAKING RETICULATED STRUCTURES

This application is a continuation-in-part of my application Ser. No. 778,134, filed Nov. 22, 1968, now U.S. Pat. No. 3,577,587.

The present invention is directed to an improved method for making reticulated structures by extrusion.

U.S. Pat. No. 2,919,467 is directed to the manufacture of net-like structures in which the mesh intersection-forming portions are each composed of an integrally extruded plastic mass and the mesh strand-forming portions are divisions of such intersection-forming portions, with the whole fabric or structure being an integrally extruded entity. The net-like structure produced by this method varies in thickness, with the portions at which the strands intersect being twice the thickness of the strands themselves. As a result, such fabrics lack flexibility and are not wholly suitable for many uses, as for example as bonded reinforcements for sheets or films.

U.S. Pat. No. 3,019,147 discloses an apparatus for making flat netting by extruding plastic material through a plurality of spaced nozzles in which adjacent nozzles are periodically swung toward each other so that the streams extruded therefrom can weld together without crossing. Such apparatus requires numerous moving parts, nozzles which are of complicated construction and is not entirely suitable for making extremely fine mesh netting. Accordingly, a primary object of this invention is to provide a generally new or improved and more satisfactory method for making net-like structures and fabrics.

Another object of this invention is the provision of a method capable of producing reticulated structures having fine mesh openings.

Still another object is the provision of an improved method for making reticulated structures of honeycomb construction by extrusion.

A further object is the provision of an improved method for making reticulated structures at high rates of speed.

These and other objects are accomplished in accordance with the method of the present invention in which a series of generally like, spaced, unconfined streams of flowable material are continuously extruded under substantially the same pressure, with each extruded stream moving along an individual sinuous path and with the sinuous paths of adjacent of such streams being 180° out of phase with each other in frequency and of such amplitude as to cause such adjacent streams to periodically contact with each other and thereby form junctions. The extruded streams and junctions are then set to provide an integral reticulated structure. The unconfined streams are all extruded within a single surface, the term "surface" being employed throughout the description and claims in its general sense as a two-dimensional locus of points and thus includes both planes and curved (e.g. cylindrical) surfaces.

Desirably, the amplitude of the sinuous paths of adjacent streams is only such as to insure contact between such streams and will depend, of course, on the spacing between such adjacent streams. The frequency together with the amplitude of the sinuous paths of the extruded streams will determine the size of the openings in the resulting reticulated product. Preferably, all of the extruded streams are of like frequency and amplitude.

The extruded streams are of generally like cross-section and may be, for example, round, rectangular or perhaps oval in configuration. The streams of flowable material may be considerably greater in width than in thickness, or of ribbon shape, to provide reticulated structures which are of honeycomb construction.

The apparatus employed in the method of the present invention includes a housing into which a flowable material is delivered under pressure and which has spaced opposing walls which together define an extrusion orifice. A series of spaced partitions are positioned within the housing, between the opposing walls thereof, and terminate at least within the housing opening. Each of these partitions has surfaces which extend transversely of the housing opening together defining an extrusion orifice. Preferably, but not necessarily, at least portions of the opposing surfaces of adjacent of such partitions extend in converging relationship in the areas adjacent to their free ends.

The apparatus also includes means for providing relative longitudinal movement between adjacent partitions so that each projects beyond the other in alternate relationship. Preferably, such means reciprocate the partitions longitudinally relative to the housing and the walls defining the housing opening, with alternate of the partitions moving in unison and substantially 180° out of phase with the partitions which are adjacent thereto. To insure proper control over the shape and direction of the extruded streams, the partitions are preferably not projected beyond or outwardly of the housing opening during their reciprocation. Suitable means are provided outwardly of the housing opening for setting the flowable material which issues from the extrusion orifices.

More particularly, the converging portions of the opposing surfaces of adjacent partitions define lips, the inner faces of which are preferably of concave configuration in a longitudinal direction of the respective partitions. These converging portions may be spaced from each other so that they, together with the walls of the housing opening, define an extrusion orifice of rectangular configuration. This spacing between the converging portions of adjacent partitions may be considerably less than the width of the housing opening so that the stream of flowable material which is extruded therefrom is in the form of a narrow ribbon. Alternatively, the opposing surfaces of each pair of adjacent of the partitions may be formed with opposing grooves extending longitudinally thereof in the areas adjacent to their free ends. These grooves are of concave cross-section and together define an orifice of generally annular configuration. Moreover, these grooves may be of a width equal to or less than the width of the housing opening and, at the free ends of the partitions, extend in converging relationship with each other.

In the operation of the above-described apparatus, flowable material rides along the longitudinally concave portions or lips of the alternate partitions which are in their lowermost positions and is extruded as a series of individual streams. All of such streams are directed downwardly and laterally, with alternate of such streams moving in the same lateral direction and opposite to the lateral movement of the streams adjacent thereto. As the free ends of the partitions which are adjacent to such alternate partitions next assume lowermost positions, the continuity of the extruding streams is unbroken. However, the longitudinal concave portions of these now projecting partitions cause the streams to reverse their lateral direction of travel. With continued relative movement between adjacent partitions so that each projects beyond the other in alternate relationship, the extruded streams are caused to assume sinuous paths. The pressure applied to the flowable material is, of course, sufficient to insure that adjacent extruded streams periodically contact with each other as they move along their sinuous paths.

The concavity formed along the converging portions of the opposing surfaces of adjacent partitions will determine the trajectory of the extruded streams, with the greater the concavity of such converging portions the greater the horizontal component of such streams.

The opposing surfaces of the partitions, which at least assist in defining the extrusion orifices, are preferably formed of or coated with a substance which is not readily wet by the flowable material being extruded. For example, such opposing surfaces may be coated with polytetrafluoroethylene resin when employed in extruding a molten thermoplastic material such as polyethylene.

The teachings of the present invention are applicable for use with a variety of fiber-forming materials, which are referred to by the terms "plastic" and "flowable strand-forming materials," including polyolefins, such as polyethylene, polypropylene, polybutylene, polystyrene, polystyrene-acrylonitrile blends, acrylonitrile butadiene-styrene blends, acrylonitrile-butadiene copolymers, polybutene, polyisobutylene, polyisoprene, and isobutylene-isoprene copolymers; halogenated olefins, such as polyfluoroethylene, polychlorofluoroethylene, polychlorofluoropropylene, polyvinyl chloride, polyvinylidene chloride, polyvinyl chloride-acetate copolymer, polyvinyl chloride-polypropylene copolymer, polychloroprene, fluoroinated ethylene-propylene copolymers, vinylidene fluoride-chlorotrifluoroethylene copolymers, and vinylidene fluoride-hexafluoropropylene copolymers; polyesters, such as polyethylene terephthalate and copolymers thereof and polycarbonate; polyamides, such as polyhexamethyl adipamide, polycaprolactam, polyhexamethylene sebacamide, poly-amino-undecanoic acid; polyvinyl acetates; chlorinated polyethers, such as, ethylacrylate-chloroethylene vinyl ether copolymer; acrylic resins, such as polyacrylonitrile, polyacrylates and methacrylates; natural rubbers; compounded silicones; polyurethanes; polyethers, such as polyformaldehyde, formaldehyde-ethylene oxide copolymers, and polytrioxane; polysulfur resins, such as polysulfones and polysulfides; water-soluble, alkali soluble, and organic solvent-soluble cellulose esters and ethers, such as cellulose nitrate, cellulose acetate, cellulose butyrate, cellulose propionate, ethyl cellulose, viscose or cellulose xanthate, cuproammonium cellulose, and carboxymethyl cellulose; glasses; metals, etc. Such materials may include various additives such as stabilizers, dyes, foaming agents, etc., if so desired.

It will be apparent that the manner by which the extruded junction and mesh-strand forming streams are set will depend upon the particular material which is being employed.

For a greater understanding of the invention, reference is made to the following detailed description and drawing, in which FIG. 1 is a vertical section taken longitudinally of the apparatus employed in the method of the present invention;

FIG. 2 is a transverse vertical section taken substantially along the line II—II of FIG. 1;

FIG. 3 is a fragmentary view illustrating elements of the apparatus shown in FIG. 1 in one position during operation;

FIG. 4 is a view similar to FIG. 3 showing the elements in another position during operation of the apparatus;

FIG. 5 is a view similar to FIGS. 3 and 4 showing the elements in still another position during operation of the apparatus;

FIG. 6 is a horizontal section illustrating a portion of the apparatus shown in FIG. 1;

FIG. 7 is a view similar to FIG. 6 illustrating another modification of the apparatus shown in FIG. 1;

FIG. 8 is a view similar to that shown in FIG. 5 illustrating a still further modification of the apparatus shown in FIG. 1; and FIG. 9 is a diagrammatic view showing a reticulated structure formed with an apparatus as illustrated in FIG. 8.

With reference to FIGS. 1 and 2 of the drawing, the apparatus employed in the method of the present invention includes a housing 15 having a chamber 17 into which a flowable strand-forming material is delivered under pressure through an inlet 19. Side walls 21 and 23 and end walls 25 and 27 of the housing 15 together define an elongated opening 29.

A series of partitions or extrusion elements 31 are positioned within the housing 15, between the side walls 21 and 23, and terminate within the housing opening 29. The opposing surfaces 33 of adjacent partitions 31 are uniformly spaced from each other along the major portion of their lengths and converge at 35 to provide lips 37 at the free ends of such partitions. The portions 35 of the partition surfaces 33 are preferably of concave configuration, as illustrated, but may be shaped to provide for a more gradual convergence between opposing of such surfaces. In the position of the partitions 31 shown in FIG. 3, the lips 37 of adjacent partitions 31 are in contact with each other.

Extending at least along each of the arcuately converging portions 35, and preferably longitudinally along a substantial portion of each of the partition surfaces 33, is a groove 39 which is of generally uniform depth and of arcuately concave and, more particularly, semi-circular configuration. As shown in FIG. 6, the grooves 39 in opposing partition surfaces 33 together define an extrusion orifice 41 between the partition lips 37, with such orifice having a diameter which is only slightly smaller than the thickness of the partitions themselves.

The partitions 31 are mounted within the housing 15 for relative longitudinal movement whereby the free end of each partition may be alternately projected and retracted beyond the free end of a partition which is directly adjacent thereto, as shown in FIGS. 4 and 5.

This may be accomplished by longitudinally reciprocating alternate partitions 31 while the partitions adjacent thereto are maintained stationary. More preferably, all of the partitions 31 are simultaneously reciprocated in a longitudinal direction, with alternate partitions moving in the same direction and opposite to the partitions 31 which are adjacent thereto. Thus, as any one of the partitions 31 is moving toward the exit of the housing opening 29, the partitions 31 on either side thereof are concomitantly being retracted. As more fully described hereafter, the extent to which the free ends of the partitions are projected beyond the free ends of the partitions which are adjacent thereto may be varied. Generally, the partitions 31 should not be projected outwardly of the exit end of the housing opening 29.

The desired reciprocation of the partitions 31 may be achieved by a variety of different means. One such means is illustrated in FIGS. 1 and 2 of the drawing and includes a crank shaft 43 and crank arms 45. The ends of the crank shaft 43 are rotatably supported by and extend beyond the housing end walls 25 and 27. A driving force may be applied to either or both ends of the crank shaft 43 by suitable means, not shown, to rotate the same at a uniform rate of speed. A cylindrical bearing 47 is formed at one end of each of the crank arms 45 which rides on the crank shaft 43. The opposite ends of the individual crank arms 45 are hinged by pins 49 to the partitions 31.

The crank shaft 43 is shaped to impart continuous reciprocating motion simultaneously to all of the crank arms 45 and the partitions 31 which are hinged thereto, with alternate of such partitions 31 being in phase and 180° out of phase with the partitions 31 which are adjacent thereto.

In the operation of the above-described apparatus a flowable or plastic strand-forming material, such as molten polypropylene, is delivered under pressure through the housing inlet 19 to fill the chamber 17, including the portions thereof between and around the partitions 31. Assuming that the partitions 31 are in positions as shown in FIG. 3, the molten polypropylene will issue from the extrusion orifices 41 as a series of laterally spaced vertical streams located in substantially the same surface or plane.

As the crank shaft 43 is rotated, alternate of the partitions 31 are projected toward the exit end of the housing opening 29 while the partitions 31 which are adjacent thereto are retracted into positions as shown in FIGS. 1 and 4. During such movement, the arcuate portions 35 of the partitions 31 which are being projected exert a lateral force upon the molten polypropylene which flows relative thereto. Thus, the streams of molten polypropylene issuing from between adjacent partitions are gradually deflected laterally from their original vertical paths without interrupting the continuity of such streams.

As shown in FIG. 1, alternate of these deflected streams 51, 53, 55 and 57 are directed along similar paths which intersect with the paths of the respective adjacent streams 59, 61, 63 and 65. The more pronounced the convergence between the portions 35 of opposing partition surfaces 33, the greater will be the lateral deflection of the extruding streams. The degree to which such extruded streams are deflected in the lateral direction is one factor which will determine the mesh pattern of the resulting reticulated structure.

The pressure applied to the flowable or plastic material must be sufficient to insure that the extruded streams, which are along intersecting paths, contact and bond with each other as indicated at 67. Excessive pressure may cause distortion of such streams at their locations of contact and should be avoided.

Upon movement of the partitions 31 from their positions shown in FIG. 4 to that shown in FIG. 5, the extruding streams change their directions of lateral travel, with each stream now following a path which is generally parallel to the paths heretofore assumed by the adjacent streams. In other words adjacent extruded streams which had traveled along converging or intersecting paths, such as the streams 51 and 59, now assume diverging paths, while the adjacent streams which heretofore had diverging paths, such as the streams 53 and 59, now assume converging paths.

As the streams which are extruded along their newly assumed paths contact and bond with each other, as indicated at 69, the partitions 31 are again reciprocated into positions as shown in FIG. 4. It will be apparent that by moving the elements 31 alternately into positions as shown in FIGS. 4 and 5, each of the extruded streams follows a sinuous path, with the paths of adjacent streams being 180° out of phase with each other in frequency. The amplitude of the individual sinuous paths, which is determined primarily by the concavity of the portions 35 of the partition surface 33 and the pressure applied to the material being extruded, is such that the adjacent extruded streams periodically contact with each other.

Any suitable means may be positioned below the housing 15 to set the extruded streams into a reticulated structure. When extruding molten thermoplastic material, such means may be, for example, a nozzle as shown at 71 for discharging chilled air against the extruded and bonded streams.

In lieu of the arrangement described above, the partitions 31 may be substantially thicker than the diameter of the extrusion orifice which is formed between adjacent of such partitions. This modification, as illustrated in FIG. 7, provides for significant contact and thus better sealing between the opposing surfaces of adjacent partitions 31.

As heretofore mentioned, extrusion orifices may be shaped to provide extruded streams which are round, rectangular or perhaps oval in cross-section. A modification of the above-described apparatus for providing extruded streams of rectangular cross-section is shown in FIG. 8 and includes partitions 73 which are considerably greater in width than the spacing between adjacent of such partitions. Adjacent of such partitions 73, together with the side walls 21 and 23 of the housing 15, define extrusion orifices which are greater in length than in width so that flowable or plastic material issuing therefrom is of ribbon-like form. While the operation of the apparatus shown in FIG. 8 is substantially the same as that heretofore described, the resulting reticulated structure is of honeycomb construction, as indicated at 75 in FIG. 9.

I claim:

1. Method of making a reticulated structure including the steps of continuously extruding each of a series of generally like, spaced, unconfined streams of flowable strand-forming material along an individual sinuous path with the successive portions of each of such streams of flowable strandforming material being extruded under the same pressure, all of such sinuous paths being located along a common surface with the sinuous paths of adjacent of extruded streams being substantially 180° out of phase with each other in frequency and of such amplitude that the unconfined streams extruded along such adjacent sinuous paths periodically contact and bond with each other at locations spaced from the locations of extrusion and thereby form junctions, and thereafter setting the extruded streams and junctions to provide an integral reticulated structure.

2. A method as defined in claim 1 wherein all of the sinuous paths are of like frequency and amplitude.

3. A method as defined in claim 1 wherein each of the extruded streams are rectangular in cross-section, with its width being greater than its thickness whereby the resulting reticulated structure is of honeycombed construction.

4. A method as defined in claim 1 wherein said streams are of generally circular cross-section.

* * * * *

PO-1050
(5/69)

UNITED STATES PATENT OFFICE
CERTIFICATE OF CORRECTION

Patent No. __3,683,059__  Dated __August 8, 1972__

Inventor(s) __Theodore H. Fairbanks__

It is certified that error appears in the above-identified patent and that said Letters Patent are hereby corrected as shown below:

In the ABSTRACT OF THE DISCLOSURE, line 4, after "extruded" insert --under the same pressure--; line 5, delete "under the same pressure"; line 5, after "extruded" insert --streams--.

Signed and sealed this 9th day of January 1973.

(SEAL)
Attest:

EDWARD M. FLETCHER, JR.
Attesting Officer

ROBERT GOTTSCHALK
Commissioner of Patents